United States Patent [19]

Kawashima

[11] Patent Number: 4,631,977
[45] Date of Patent: * Dec. 30, 1986

[54] POWER TRANSMISSION CASING IN MOTORIZED TWO-WHEELED VEHICLE

[75] Inventor: Yoshinori Kawashima, Sakado, Japan

[73] Assignee: Honda Giken Kogyo Kabushiki Kaisha, Tokyo, Japan

[*] Notice: The portion of the term of this patent subsequent to Jan. 15, 2002 has been disclaimed.

[21] Appl. No.: 534,215

[22] Filed: Sep. 20, 1983

[30] Foreign Application Priority Data

Sep. 20, 1982 [JP] Japan ............................. 57-163388
Sep. 20, 1982 [JP] Japan ........................... 57-142202[U]

[51] Int. Cl.[4] .............................................. F16H 57/04
[52] U.S. Cl. .................................... 74/606 A; 474/93; 474/150
[58] Field of Search ............. 74/606 A; 474/144, 146, 474/93; 416/235, 186 R

[56] References Cited

U.S. PATENT DOCUMENTS

| 1,873,974 | 8/1932 | Meyer | 416/186 R |
| 2,443,075 | 6/1948 | Locke | 74/606 A |
| 2,500,216 | 3/1950 | Szekely | 74/606 A |
| 3,857,179 | 12/1974 | Haupt | 474/144 |
| 4,344,500 | 8/1982 | Kurata et al. | 474/146 |
| 4,493,677 | 1/1985 | Ikenoya | 74/606 A |

Primary Examiner—Gary L. Smith
Assistant Examiner—Vinh Luong
Attorney, Agent, or Firm—Armstrong, Nikaido, Marmelstein & Kubovcik

[57] ABSTRACT

Power transmission of the belt type which includes a transmission casing made up of a case and a cover. A drive shaft and a driven shaft each extend into the case. A drive pulley is mounted on the drive shaft and a driven pulley is mounted on the driven shaft. A belt extends over both the drive pulley and the driven pulley. A fan is mounted on at least one of the shafts. A partition plate extends the length of the casing dividing the casing into a case side compartment and a cover side compartment. The belt and the fan are positioned in the cover side compartment. The fan can be formed on an outer side of one of the pulleys including radially outwardly extending fins and side fins extending axially integrally from the radial fins. Air passages are formed between any two fins and between each side fin and the outer side of the pulley. All of the side fins together can form an annular disc.

4 Claims, 8 Drawing Figures

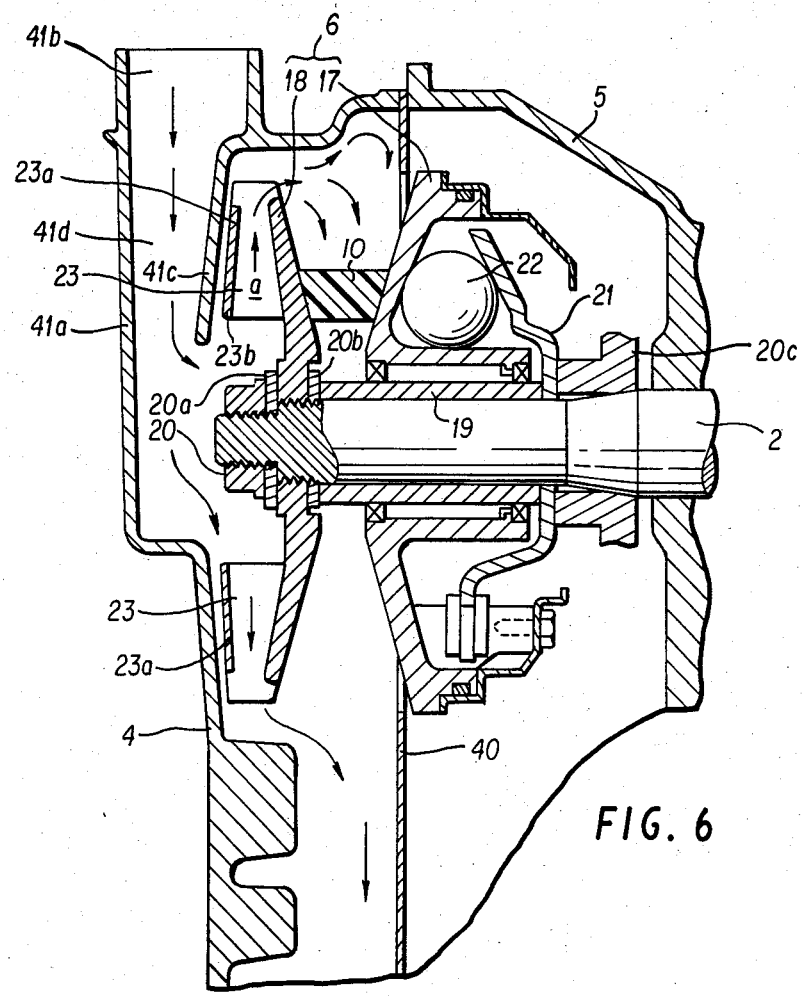
FIG. 6
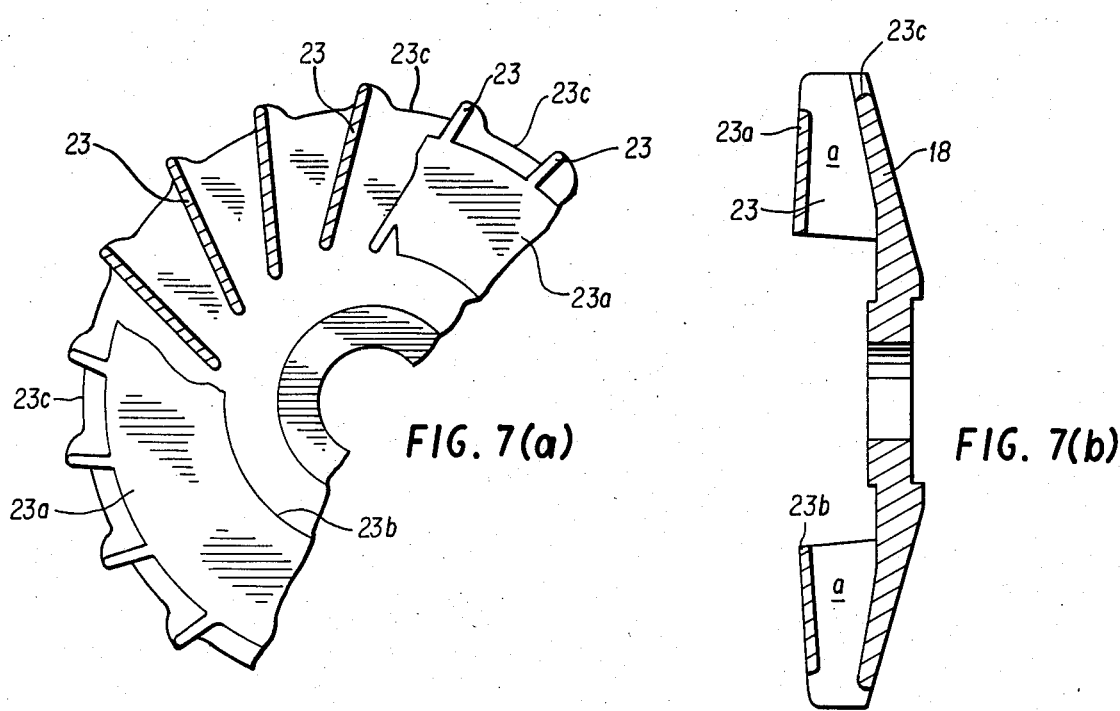
FIG. 7(a)
FIG. 7(b)

POWER TRANSMISSION CASING IN MOTORIZED TWO-WHEELED VEHICLE

BACKGROUND OF THE INVENTION

The present invention relates to improvements in a belt-type power transmission, and more particularly, it relates to improvements in cooling for air cooling the belt of a belt-type power transmission.

In motorcycles with relatively small engine output, automatic transmissions of the belt-type are commonly used for transmitting rotation of the engine output shaft to the drive wheel. These automatic transmissions generally include a V belt and variable diameter pulleys. In power transmissions of this type, heat develops by friction between the belt and the pulleys. Particularly, the generation of heat is greater where the distance between the left and right portions of for example, the drive pulley is changed to vary the effective pulley diameter to produce a stepless speed change.

In such automatic transmissions, as is well known, heat which is generated by friction heating of the belt becomes a serious problem because the entire transmission is provided in a casing which includes a transmission case proper and a cover. The cover is provided for preventing dust, muddy water and the like from entering into the transmission. However, the cover tends to trap the heat generated in the belt.

Further, the transmission casing also generally houses auxilliary systems, such as the starter system so that the casing is larger than that which is needed only for incorporating the belt. In conventional transmission mechanisms, the transmission casing constitutes a single compartment.

Commonly, air cooling of the belt and the compartment is performed by installing fins on the drive pulley which is provided on the drive shaft so that it may function as a fan producing air flow in the transmission casing. In the conventional casing comprising a single compartment, air produced by the fins on the fan does not necessarily concentrate on the belt portion where the majority of heat is produced, but rather flows to other portions inside the casing. Moreover, the speed of air flow is not very great through the entire casing.

OBJECTS AND SUMMARY OF THE INVENTION

It is an object of the present invention to provide a transmission mechanism of the belt type wherein air flow produced by a portion of the mechanism is concentrated onto the belt which is the major heat producer and its immediate neighborhood.

It is a further object of the present invention to provide an improvement in belt-type transmissions wherein the belt is cooled effectively and simply.

It is still a further object of the present invention to provide such an improvement which does not considerably add to the weight or structure of the transmission.

It is yet another object of the present invention to provide an improved belt drive pulley fan for enhancing flow of air through the transmission.

It is still another object of the present invention to provide an improved belt drive pulley fan which is simple to produce and does not increase the number of parts in the assembly of the transmission.

These and other objects are obtained in an improvement in a power transmission of the belt type having a transmission casing which includes a case and a cover, a drive shaft extending into the case, a drive pulley on the drive shaft, a driven shaft extending into the case, a driven pulley on the driven shaft, a belt extending over both the drive pulley and the driven pulley, and fan means on at least one of the shafts. The improvement comprises a partition plate extending the length of the casing dividing the casing into a case side compartment and a cover side compartment. Further, the improvement includes the belt and the fan means being positioned in the cover side compartment.

The fan means can comprise a fan formed on an outer side of one of the pulleys. The fan includes radially outwardly extending fins and side fins extending axially integrally from the radial fins. The side fins and the radial fins form air passages each between any two fins and between each side fin and the outer side of the pulley.

BRIEF DESCRIPTION OF THE DRAWINGS

The above and other objects and the attendant advantages of the present invention will become readily apparent by reference to the following detailed description when considered in conjunction with the accompanying drawings wherein:

FIG. 6 is a sectional side view of an improved fan means in accordance with the present invention;

FIG. 7(a) is a side view partly cut off showing the outer face of a drive pulley incorporating a fan means in accordance with the present invention; and FIG. 7(b) is a longitudinal sectional view of the embodiment shown in FIG. 7A.

DETAILED DESCRIPTION OF PREFERRED EMBODIMENTS

Figure 1:
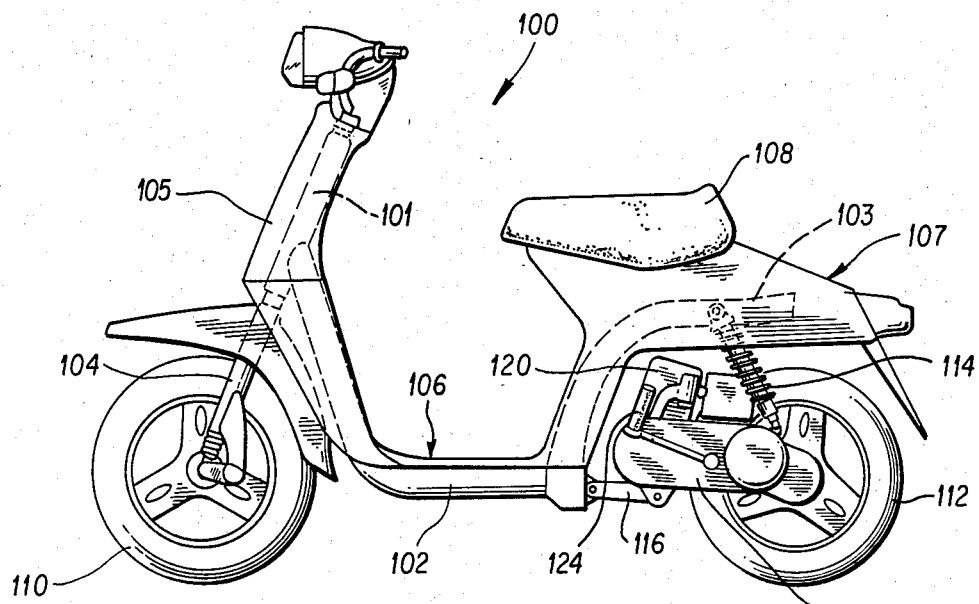
FIG. 1 shows a general view of a motorcycle of the type which would benefit from the present invention.
Figure 3:
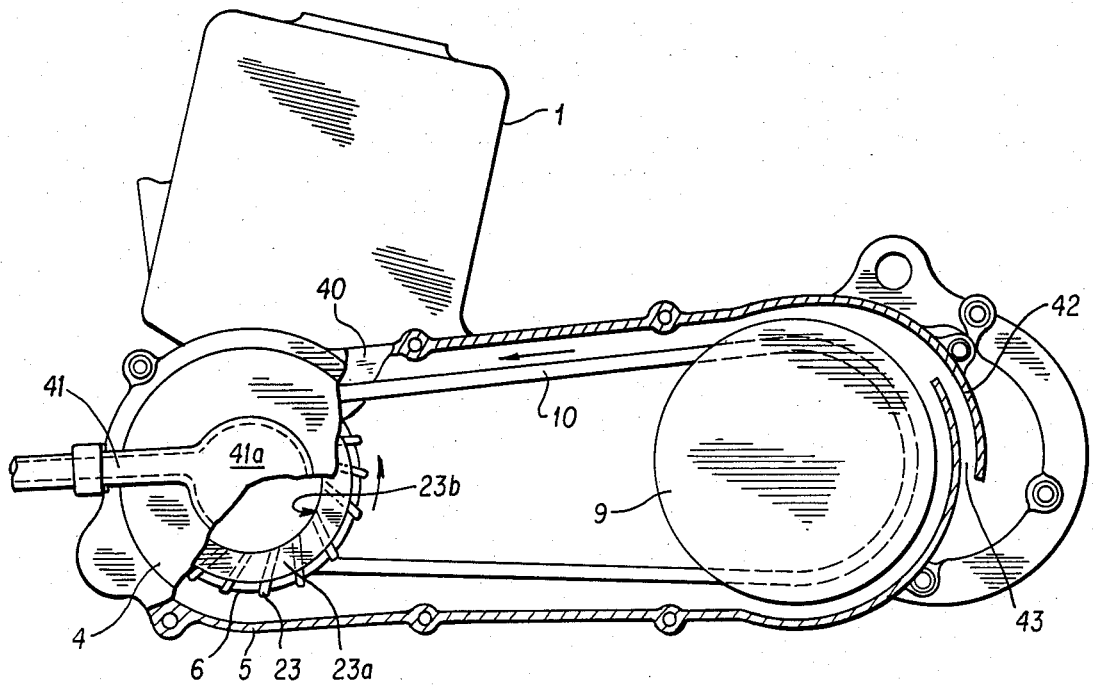
FIG. 3 discloses a schematic side view of the power transmission shown in FIG. 2.

With reference to the drawings, the present invention is extremely useful in a motorcycle of the type shown in FIG. 1. The motorcycle 100 has a frame which comprises head pipe 101 connected to downframe 102 which in turn is connected to rear frame 103. A front fork 104 is pivotally mounted in the head pipe 101. A front wheel 110 is mounted on the front fork 104. The rear frame 103 extends backwardly and upwardly from the downframe 102 for mounting of the rear wheel 112 and the engine 120. The engine 120 and the rear wheel 112 are interconnected by the automatic power transmission system 122 as an integral unit. This unit is mounted to the downframe 102 and the rear frame 103 by a link 116 and a shock absorber 114, respectively. The transmission can include a kick start pedal 124. Covers are provided for the various portions of the frame including a front cover 105 covering the head pipe 101, a step floor 106, covering the downframe 102, and a rear cover 107 covering the rear frame 103. A seat 108 is provided on the rear cover 107.

Figure 2:
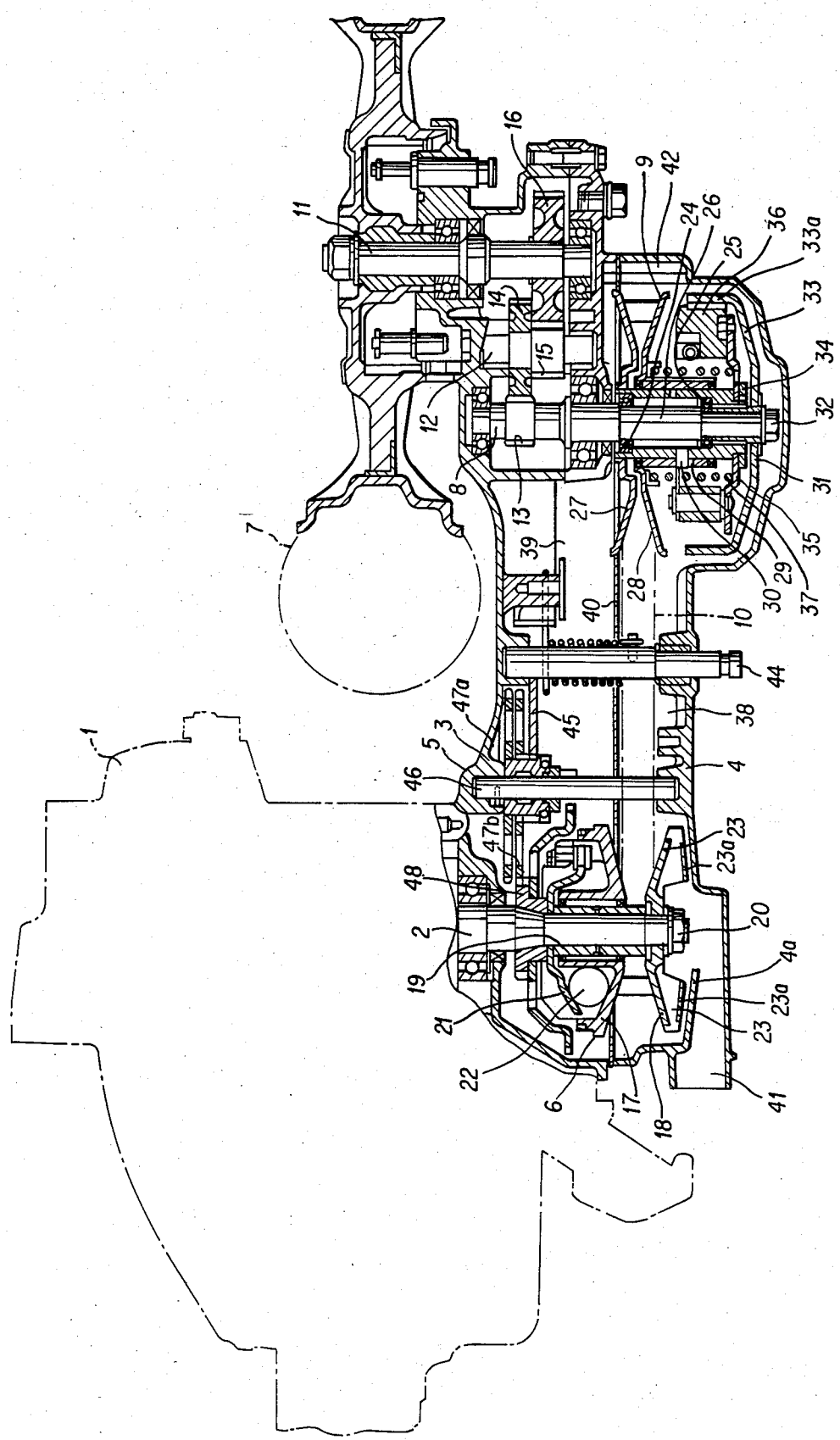
FIG. 2 shows a sectional view of a power transmission of the belt type incorporating the present invention.

FIG. 2 shows a sectional view of a power transmission of the belt type for a motorcycle incorporating the present invention. A crank shaft 2 of an engine 1 extends into the transmission casing 5. The transmission casing 5 includes a case proper 3 opening to a side of the motorcycle 100 and a cover 4 closing the opening. The crankshaft 2 forms a drive shaft for the transmission.

A drive pulley 6 is installed on the crankshaft 2. A driven shaft 8 extends into the casing 5 and has thereon a driven pulley 9. A belt 10 extends over both the drive pulley 6 and the driven pulley 9.

An intermediate shaft 12 is provided between the axle 11 of the rear wheel 7 and the driven shaft 8. The rotation of the driven shaft 8 is transmitted to the axle 11 by gear 13 on the driven shaft 8 and gear 14 on the intermediate shaft 12 which mesh together and a gear 15 on the intermediate shaft 12 and a gear 16 on the axle 11 which mesh together.

The drive pulley 6 comprises a movable face 17 and a fixed face 18. The movable face 17 is axially slidable and is inserted over the periphery of a collar 19 inserted on the crankshaft 2. The fixed face 18 is inserted over the end of the crankshaft 2 and is fixed against the end of the collar 19 by a nut 20 tightened onto the shaft end. As can be seen in FIG. 6, the fixed face 18 is held between thrust washers 20A, and 20B provided on its inner and outer sides.

A ramp plate 21 is secured to the movable face 17 and a weight roller 22 is placed between the ramp plate 21 and the back of the movable face 17. The distance between the ramp plate 21 and the back of the movable face 17 is formed so as to be increasingly shorter as it moves outwardly toward the periphery thereof. Thus, when the weight roller 22 moves outwardly by virtue of centrifugal force, the movable face 17 is made to move toward the fixed face 18 to a position proportional to the centrifugal force. In this manner, the effective radius of the belt 10 extending around the drive pulley 6 becomes larger. A plurality of fins 23 are provided on the side of the fixed face to act as a fan means.

The driven pulley comprises a fixed face 21 welded to a boss 26 that is rotatably inserted over the driven shaft 8 through bearings 24, 25 and a movable face 27 slidably inserted over the boss 26. The movable face 28 has a cam groove 29 formed to be inclined at a specified angle (of approximately 45 degrees) to the axial direction of the boss. A pin 30 planted on the boss 26 is inserted into the cam groove 29. Consequently, the movable face 28 rotates as it moves in the axial direction.

A centrifugal clutch 31 for coupling the driven pulley 9 with the driven shaft 8 is provided on the driven shaft 8. The centrifugal clutch 31 comprises a clutch outer member 33 fixed to the end of the driven shaft with a nut 32. The clutch outer member 33 is bowl-like and U-shaped in section. A clutch plate 35 is fixed to the end of the boss 26 with nut 34. A clutch shoe 36 is pivotally connected to the clutch plate 35 inwardly of a cylindrical portion 33A of the clutch outer member 33 and is adapted to be expandable in the radial direction. When rotation of the boss exceeds a preset number of revolutions the clutch shoe 36 expands to come into contact with the inner surface of the clutch outer member 33 thus transmitting rotation to the driven shaft 8. The movable face 28 is biassed to the fixed face 27 side by a spring 37 placed between the movable face 28 and the clutch plate 35 so as to have the movable face 28 positioned at a location where the tensile force on the belt 10 is in equalibrium with the force of the spring 37.

The transmission can also include a kick starter. The kick starter includes a kick shaft 44. Rotation of the kick shaft 44 is transmitted to the crank shaft 2 by meshing between a gear 45 of the kick shaft 44 and a gear 47A of an intermediate shaft 46 and by meshing between a gear 47B of the intermediate shaft 46 and a gear 48 on the crankshaft 2.

The present invention particularly resides in a partition plate 40 dividing the space in the transmission casing 5 into two compartments extending longitudinally of the casing 5. The two compartments can be characterized as a cover side compartment 38 and a case side compartment 39. The partition plate 40 is placed between the mating surfaces of the cover 4 and the case proper. The cover side compartment 38 can be considered a belt compartment because the belt 10 is on this side of the partition plate. The case side compartment 39 can be considered an auxilliary compartment because it includes the structure for moving the movable plate 17, the kick starting system, and the gearing structure between the driven shaft 8 and the axle 11.

An air induction passage 41 for introducing fresh air from an air inlet into the transmission casing 5 can be formed on a portion of the cover 4 adjacent the drive pulley 7. An air exhaust passage 42 can be formed in a portion of the cover to the rear of the drive pulley 6 with the air outlet 43 being directed downwardly.

Figure 4:
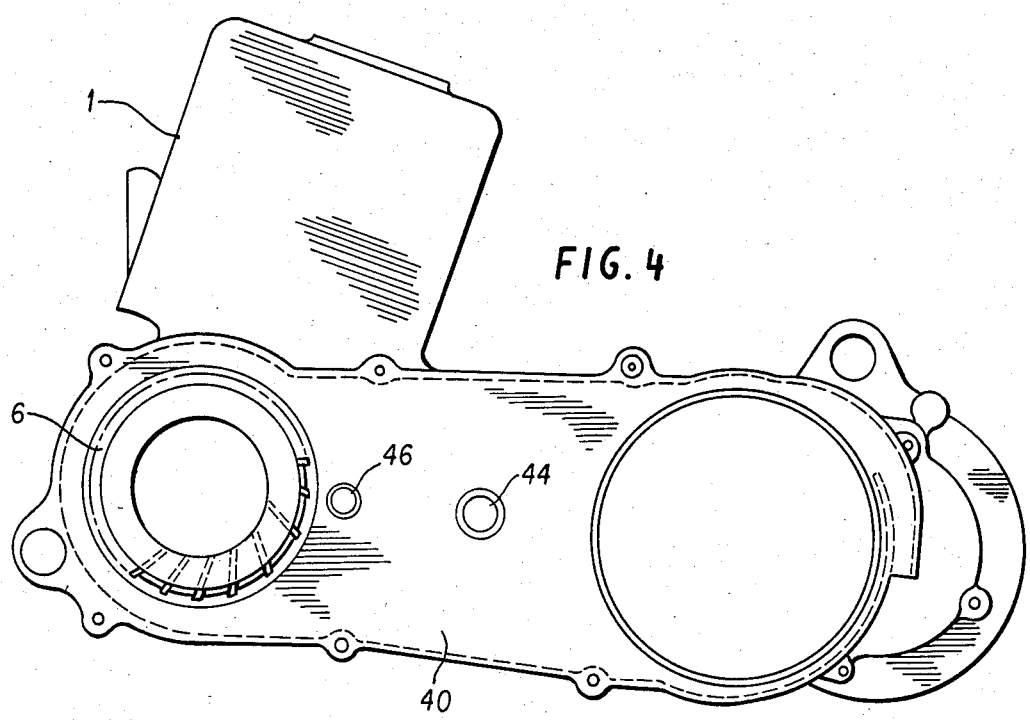
FIG. 4 is a side view of the power transmission of FIG. 2 with the cover removed.

The partition plate 40 is provided with holes at a portion for the movable face 17 of the drive pulley 6, at a portion for the fixed face 27 of the driven pulley 9, and at appropriate portions for the kick shaft 44 and the intermediate shaft 46. These can be clearly seen in FIG. 4.

Figure 5:
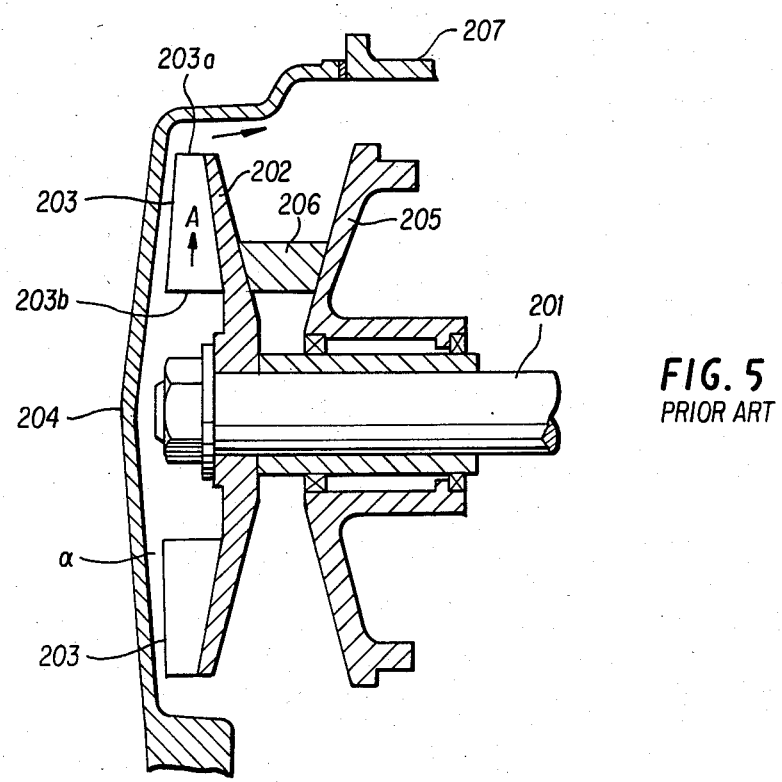
FIG. 5 is a sectional view partly omitted showing a conventional fan means on a drive pulley.

In the past, as shown in FIG. 5, it is known to provide a fan on a drive pulley. A plurality of fins 203 can be integrally provided on the outer side of a fixed face 202 of the drive pulley to be rotated by the crank shaft 201 of an engine. Air in the transmission compartment can be forceably circulated by such a fan.

In operation, air flow in the direction of arrow A along the faces of the fins 203 is produced by rotation of the fan. That is, rotation of the fixed face 202 produces air flow from the peripheral ends 203A of the fins 203. As a result, the volume adjacent the inner peripheral end 203B of the fins becomes relatively at a negative pressure thereby drawing air from the neighborhood of the side cover 204 to generate the air circulation.

However, in such a conventional cooling mechanism, because a gap $\alpha$ is formed between the outer edges of the fins 203 and the internal wall of the side cover 204, part of the air that flows in the direction of the arrow A in FIG. 5 also flows into the gap $\alpha$. Consequently, effective negative pressure does not develop in the vicinity of the inner peripheral end 203B of the fan to the extent that it could. In order to effectively develop negative pressure to enhance the blowing of the fan, the prior art has attempted to reduce the gap $\alpha$ to be as small as possible or even to eliminate it. However, in practical reality, because the cover 204 is a removable fixed body while the fins 203 are rotating bodies, it is necessary to maintain the gap $\alpha$ to prevent mutual interference. That is, the cover 204 must be removable for work on the transmission mechanism. Consequently, with tolerances in the mechanical arts, some gap $\alpha$ must always be left to prevent the fan fins 203 from hitting the cover 204.

As shown in FIGS. 6, 7(a) and 7(b), the present invention additionally resides in a fan means provided on a pulley. The fixed face 18 of the drive pulley 6 can have thereon a plurality of radially outwardly extending fins 23 of straight shape composing a blower fan. The fins 23 are formed at equal intervals in a peripheral direction on the outer side of the fixed face 18. On the outer side portions of the fins 23 are formed side fins 23A integrally with the fins 23. The side fins 23A form with the fins 23 respective air passages "a". As shown in FIG. 7(a), the outside face of the side fin 23A is formed flush with the outer edges of the fins 23 so that as can be seen in FIG. 7(b), when viewed from the side, the entire side fin 23A, constitutes an uninterrupted annular disc. Thus, a circular fresh air entrance bounded by the edge 23B is formed at the center of the fixed face 18. The outer peripheral edge of the side fins 23A extend close to the outer peripheral edge of the fixed face 18. Grooves 23C are formed each on a portion between any two fins 23 at the outer peripheral edge of the fixed face 18 so as to make it easy for a portion of the air that passes through the air passages "a" and goes out from the peripheral ends of the fins 23 to be delivered to the inner side (drive belt side) of the fixed face 18.

As shown in FIGS. 2 and 6, the side cover 4 can bulge outwardly at that portion corresponding to the fixed face 18 to form a bulged portion 41A. A fresh air inlet 41B can be formed thereon for introducing relatively low temperature fresh air into the bulged portion 41A. Further, a guide plate 41C can extend from the front of the side cover 4 so as to approach the outer face of the side fins 23A. In this manner, a fresh air duct 41D can be formed between the guide plate 41C and the inner surface of the bulged portion 41A. The fresh air duct 41D leads from the fresh air inlet 41B to the fresh air entrance 23B common to each of the air passages "a".

When the drive pulley 6 rotates by rotation of the crank shaft 2, air flows in the direction of the arrows shown in FIG. 6 generated by the plurality of fins 23 formed on the outer side of the fixed face 18. That is, relatively low temperature fresh air taken in from the outside flows through the fresh air inlet 41B, the fresh air duct 41C, into that portion of the fresh air entrance 23B which has a relatively negative pressure because of the rotation of the fins 23. The low temperature air passes through each of the air passages "a" between the fins 23 to be accelerated and delivered from the peripheral end side of each fin 23. The delivered low temperature air cools the belt 10, drive pulley 6, and while cooling them flows over to the driven pulley 9, cools the driven pulley 9, and is exhausted to the outside through the air exhaust passage 42 and the air outlet 43.

Because the transmission casing 5 is divided by the partition plate 40 into the cover compartment 38 and the case compartment 39, the fresh air flows only through the cover compartment 38. In comparison with a transmission having only a single compartment, the air flow in the present invention concentrates on the belt and its environs and flows very rapidly. Consequently, heat is efficiently taken away from the fan belt to cool the fan belt, the drive pulley 6 and the driven pulley 9.

The partition plate 40 can be made of a packing material and can also serve as a gasket between the cover 4 and the case 5. Alternatively, the partition plate 40 can be made of metal or of a synthetic resin.

Because the side fins 23A are provided on the outer side portion of the fins 23 of the fixed face 18, forming the air passages (a) between any two fins and between the side fin 23A and the outer side of the fixed face 18 low temperature air passing through each air passage (a) is completely delivered from the peripheral end side of each fin 23 without being diverted on the side of the guide plate 41C. As a result thereof, more effective development of negative pressure at the fresh air entrance 23B and environs is provided. The blowing effect is enhanced increasing the quantity of induced fresh air in the transmission.

Further, the side fin 23A can be formed by integral molding with the fins 23 on the fixed face 18. Consequently, assembly operation of the fins need not be necessary. Further, assembly of the fixed face 18 is no more difficult than in the conventional case wherein the side fins 23A are not provided. Still further, the clearance between the fins 23 and the cover 4 is no longer as critical as in the past since the side fins 23A close the air passages (a) to prevent air leakage on the cover side.

It is readily apparent that the above described improvements in a belt type transmission meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An improvement in a power transmission of the belt type having a transmission casing which includes a case and a cover, a drive shaft extending into said case, a drive pulley on said drive shaft, a driven shaft extending into said case, a driven pulley on said driven shaft, a belt extending over both said drive pulley and said driven pulley, and fan means on at least one of said shafts, the improvement comprising a partition plate extending the length of said casing dividing said casing into a case side compartment and a cover side compartment and wherein said belt and said fan means are positioned in said cover side compartment.

2. The improvement as claimed in claim 1 wherein said fan means comprises a fan formed on an outer side of one of said pulleys, said fan including radially outwardly extending fins and side fins extending axially integrally from said radial fins forming air passages each between any two fins and between each side fin and the outer side of the pulley.

3. The improvement as claimed in claim 2, wherein said side fins are joined together, end to end, and form an annular disc on said outwardly extending fins on said outer side of said one of said pulleys.

4. The improvement as claimed in claim 3 wherein the radial fins and the side fins are integrally molded with the outer side of the pulley.

* * * * *